Nov. 2, 1965 H. T. GNUSE 3,215,990

CONTROL CIRCUIT FOR FERROELECTRIC GATE

Filed June 4, 1962

INVENTOR.
HARMON T. GNUSE
BY John V. Regan
Attorney

United States Patent Office 3,215,990

Patented Nov. 2, 1965

3,215,990

CONTROL CIRCUIT FOR FERROELECTRIC GATE

Harmon T. Gnuse, Van Nuys, Calif., assignor to Radio Corporation of America, a corporation of Delaware Filed June 4, 1962, Ser. No. 199,911
2 Claims. (Cl. 340—173.2)

This invention relates in general to ferroelectric control or switching circuits, useful, for example, in ferroelectric electroluminescent panel type displays.

An important application of the ferroelectric (FE) control circuits or gates is the control of the bipolar voltage (including sinusoidal alternating current voltage) applied to an electroluminescent segment. Prior art arrangements have accomplished the control of the voltage applied to such an electroluminescent segment by means of circuits employing relatively large direct-current voltages which exclude the use of transistor circuitry.

Accordingly, it is an object of this invention to provide an improved ferroelectric switching circuit.

It is another object of this invention to provide an improved control circuit for a ferroelectric gate in which the range of the control voltage is suitable for transistor circuitry.

Briefly stated, the invention comprises a pair of ferroelectric elements connected to each other at a common point. A voltage energizable output element is connected in seriesw ith the pair of ferroelectric elements. A bipolar signal voltage is applied across the series circuit and when the polarization of the ferroelectric elements is in the opposite direction of each other, the pair of ferroelectric elements presents a high impedance to the voltage source and the output element is not energized. When the pair of ferroelectric elements are polarized in the same direction the impedance presented to the source by the pair of ferroelectric elements is low and the output element is energized. A control circuit comprising a variable impedance circuit and a source of direct current voltage is connected between the common point of the pair of ferroelectric elements and a point of reference potential to polarize the ferroelectric elements in opposite directions so that the change of polarity of the energizing signal does not partially switch either ferroelectric element. The condition for blocking the energization of the output element is that the direct current voltage applied is of sufficient amplitude to assure that the ferroelectric elements remain polarized in opposite directions throughout a complete cycle of the excitation input. Return of the direct current input to ground potential allows charge flow through the ferroelectrics to the output element.

The invention is discussed in greater detail below and is shown in the following drawings of which:

Throughout the figures similar reference numerals are applied to similar elements.

Figure 1:
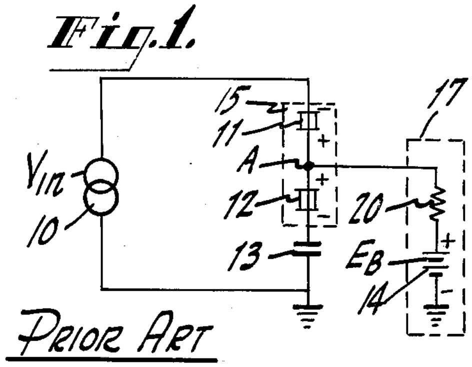
FIGURE 1 is a schematic diagram of a prior art circuit employing ferroelectric elements.

Referring to FIGURE 1, there is shown a ferroelectric gate 15 which comprises a pair of ferroelectric elements 11 and 12, which may be similar to the ones described in detail in J. R. Anderson, Patent No. 2,695,396, issued November 23, 1954, connected in series with each other at a common point A. An output element 13, which is shown as a capacitor in the drawings and which may be an electroluminescent segment or any other voltage energizable element, is connected in series with the pair of FE elements 11 and 12. The output element 13 is connected to a point of reference potential shown as ground.

A source of bipolar signal voltage 10, which may be a sinusoidal alternating current voltage, is applied across the series circuit comprising the FE elements 11 and 12 and the output element 13. A direct current control circuit 17 comprising a direct current voltage source, shown as a battery 14, and an isolation resistor 20, is connected between the common point A of the FE elements 11 and 12 and ground. The resistor 20 is connected between the common point A and the positive side of battery 14, which has its negative side connected to ground. The direct current voltage is used to control the conductance of the FE gate 15. The conductance of the FE gate 15 is determined by alternating current steady-state consideration in the circuit rather than by initial relative charges of FE elements 11 and 12.

Figure 2:
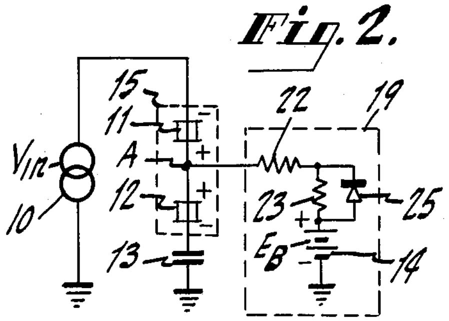
FIGURE 2 is a schematic diagram of an embodiment of the present invention.

Referring now to FIGURE 2, there is shown a circuit similar to that shown in FIGURE 1, except that the control circuit 19 comprises a resistor 22 and a parallel combination of a resistor 23 and a diode 25, connected in a series circuit between the common point A and the direct current voltage source 14. The diode 25 is poled so that the current flows from the battery 14 through the diode 25 and into the common point A when the voltage $E_B$ of battery 14 is more positive than the voltage at point A.

Figures 3, 4:
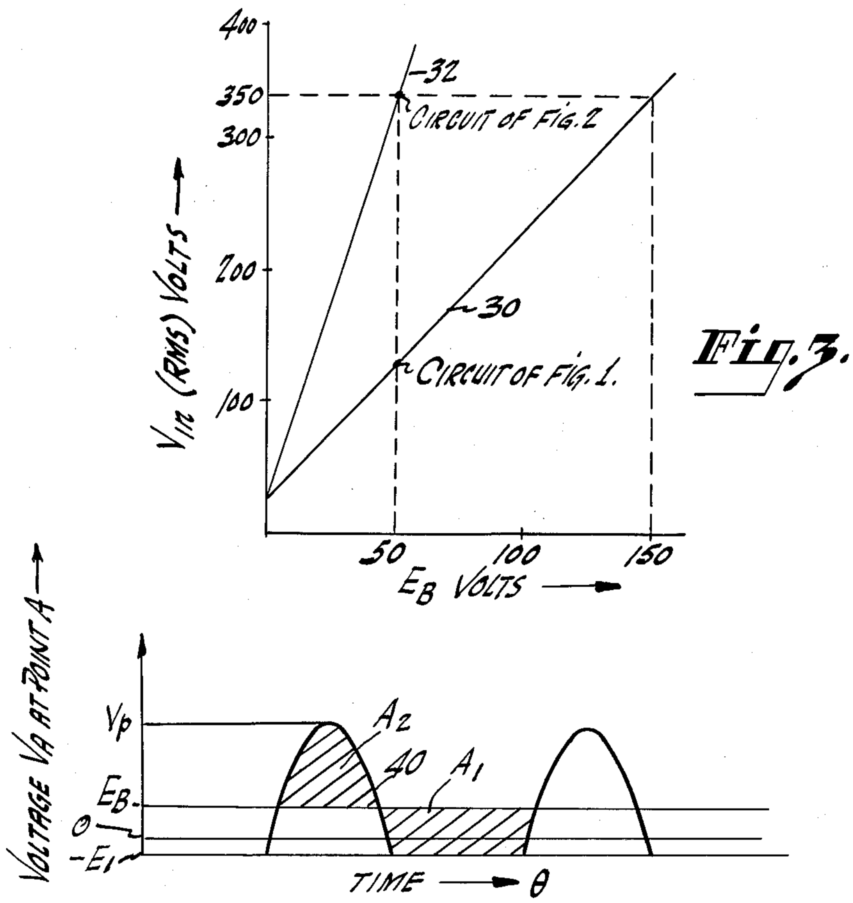
FIGURE 3 is a graph that illustrates the required direct current voltage to eliminate charge flow for various input voltages in both the circuits shown in FIGURE 1, and FIGURE 2; and, FIGURE 4 is a drawing of the waveform of the voltage at point A of FIGURES 1 and 2.

In operation, referring to FIGURES 1 and 4, the direct current voltage $E_B$ of battery 14 is applied between common point A and ground. The direct current voltage $E_B$ controls the conductance of the FE gate 15. An energizing signal voltage $V_{in}$ is applied by voltage source 10 across the FE elements 11 and 12, and the output element 13. The direct current voltage $E_B$ polarizes FE elements 11 and 12 in different directions, with respect to the energizing voltage source 10, so that elements 11 and 12 present a large impedance to the source in comparison with the impedance of element 13 during a half cycle of the excitation, and so that the FE elements 11 and 12 are clamped to a voltage $-E_1$ (the value of which depends on the type of crystals used as FE elements 11 and 12) on the other half cycle. That is, $-E_1$ is the value of voltage at which the ferroelectric crystal switches from one direction of polarization to the other. The direct current voltage required to create this situation may be calculated.

Assuming that the voltage $V_{in}$ is a sinusoidal alternating current voltage, the waveform at point A is shown in FIGURE 4. The voltage $-E_1$ is the clamp voltage of FE element 12. At a time after the transient switching response caused by adjustment of the direct current voltage $E_B$ becomes negligible with respect to steady-state conditions, the net charge flow through the isolation resistor 20, for any complete cycle of the excitation voltage $V_{in}$, must be zero. As long as resistor 20 provides the only direct current path into point A, no direct current component of the current flowing into point A through resistor 20 can exist. The following equation must be satisfied for the net charge passing through resistor 20 to be zero:

$$\int_0^{2\pi}(V_A-E_B)/R\,d\theta=0$$

where $V_A$ is the voltage at point A, R is the resistance of resistor 20, and $E_B$ is the direct current control voltage. The equation is satisfied when the shaded area $A_1$ of the waveform shown in FIGURE 4 equals the shaded area $A_2$. The minimum direct current voltage $E_B$ that renders FE gate 15 completely cutoff is obtained by solving the equation above. The minimum value of $E_B$ is:

$$E_B=\frac{V_P}{\pi}-E_1 \text{ or } E_B=.45V_{in}\text{ R.M.S.}-E_1$$

where $V_p$ is the peak value of the voltage at point A, and $-E_1$ is the clamp voltage of FE elements 11 and 12.

The relation above shows that the cutoff voltage $E_B$ is independent of the frequency of the excitation voltage $V_{in}$, and dependent on the size and specific characteristics of the FE elements 11 and 12 only to the extent in which they affect the clamp voltage $-E_1$.

When a control voltage $E_B$, having a magnitude larger than the magnitude of the minimum voltage $E_B$ which renders FE gate 15 completely cutoff, is applied to the FE gate 15, FE elements 11 and 12 do not clamp for a full half cycle but only for a smaller portion of the half cycle. The portion of the half cycle in which FE elements 11 and 12 go into clamp depends on the relative values of the control voltage $E_B$ and the excitation voltage $V_{in}$. The FE gate 15 is rendered completely cutoff, however, since no charge is conducted to the load.

When the control voltage $E_B$ has a smaller magnitude than the minimum required $E_B$ to render FE gate 15 completely cutoff, the FE element 11 draws charge through resistor 20 during the transient period and partial switching occurs. Then, in the steady-state condition, FE elements 11 and 12 have partial polarization reversals on each half cycle of the input, resulting in partial conduction of the FE gate 15.

When the control voltage $E_B$ applied to the FE gate 15 is zero volts, the FE elements 11 and 12 have complete polarization reversals (the only condition is that the excitation voltage $V_{in}$ has an amplitude that is sufficient to drive the FE elements 11 and 12 to saturation).

The direction of the current flow through resistor 20, shown in FIGURE 1, can be determined from the waveform shown in FIGURE 4. When $V_A$, the voltage at point A, has a positive value larger than $E_B$, the current flow will be from the battery 14 into the common point A, and when $V_A$ is smaller than $E_B$ (more negative) current flows through resistor 20 into the voltage source 14. Curve 30 of FIGURE 3 shows the relationship between the required direct current voltage $E_B$ to block desired values of the input voltage $V_{in}$. As an example, 150 direct current volts are required to block an input signal having a value of 350 volts R.M.S.

The operation of the circuit shown in FIGURE 2 is in many respects similar to the operation described for the circuit shown in FIGURE 1. However, when the voltage $V_A$ has a value which is larger than the applied direct current voltage $E_B$, diode 25 is non-conductive, and the resistance between common point A and the positive side of voltage source 14 is the total resistance of resistor 22 and resistor 23 in series. When the voltage $V_A$ at point A is smaller than $E_B$, diode 25 conducts and the total resistance of the series circuit between common point A and the voltage source 14 is approximately the resistance of resistor 22 alone.

The blocking condition of the circuit shown in FIGURE 2, i.e., the net charge passing through resistor 22 equal to zero for the given waveform, is obtained when the area $A_2$ is equal to the area $A_1$ multiplied by the factor $$\frac{R_1+R_2}{R_1}$$

The areas $A_1$ and $A_2$ are defined as previously described in connection with the operation of the circuit shown in FIGURE 1, with respect to the relative values of $V_A$ and $E_B$ so that the condition for minimum control voltage $E_B$ is (assuming that the resistance of resistor 22 is $R_1$ and the resistance of resistor 23 is $R_2$):

$$\int_0^{\text{Arc sin}\frac{E_B}{V_P}\text{(1st quadrant)}}\frac{V_A-E_B}{R_1}d\theta+\int_{\text{Arc sin}\frac{E_B}{V_P}\text{(1st quadrant)}}^{\text{Arc sin}\frac{E_B}{V_P}\text{(2nd quadrant)}}\frac{V_A-E_B}{R_1+R_2}d\theta+\int_{\text{Arc sin}\frac{E_B}{V_P}\text{(2nd quadrant)}}^{2\pi}\frac{V_A-E_B}{R_1}d\theta=0$$

The required $E_B$ voltage to block switching of the FE elements by a signal input voltage in the circuit shown in FIGURE 2 is less than the required $E_B$ voltage to block the same signal in the circuit shown in FIGURE 1. Curve 32 of FIGURE 3 illustrates the relationship of the direct current voltage $E_B$ required to block the desired voltage $V_{in}$ in the circuit shown in FIGURE 2.

As an example, assuming that the resistance of resistor 20 of FIGURE 1 is equal to R, and that the resistance of resistors 22 and 23 are $$\frac{R}{4}\text{ and }\frac{3}{4}R$$

respectively, in order to block an input signal of 350 volts R.M.S., approximately 50 volts direct current are required with the circuit shown in FIGURE 2, while approximately 150 volts direct current are required with the circuit shown in FIGURE 1.

What is claimed is:

1. In combination, a ferroelectric gate including, a pair of ferroelectric elements connected in series with each other, a voltage energizable output element connected to one of said ferroelectric elements, means for applying an energizing bipolar voltage across said gate and said output element, and control means for applying a direct current voltage to a midpoint between said ferroelectric elements to polarize said ferroelectric elements in opposite directions, said control means including a first resistor in series with the parallel combination of a second resistor and a unidirectional conducting device.

2. A direct-current biasing circuit for controlling the flow of energy from a bipolar voltage source to an output element by controlling the conduction of current through a ferroelectric gate, said ferroelectric gate comprising a pair of ferroelectric elements serially coupled between said bipolar voltage source and said output element, comprising in combination, a variable impedance circuit coupled to the junction point of said ferroelectric elements in said gate, said variable impedance circuit including a first resistor serially connected to the parallel combination of a diode and a second resistor, and means for serially applying a direct current biasing voltage to said variable impedance circuit to polarize said ferroelectric elements in opposite directions, whereby the ferroelectric gate is completely cutoff when the biasing voltage has a magnitude which causes the net charge passing through said variable impedance circuit due to said bipolar voltage and said biasing voltage to be zero; and the ferroelectric gate is conductive when the biasing voltage has a lesser magnitude.

References Cited by the Examiner

UNITED STATES PATENTS

| | | | |
|---|---|---|---|
| 2,550,715 | 5/51 | Norton | 323—66 |
| 2,900,622 | 8/59 | Rajchman | 340—173.2 |
| 3,018,412 | 1/62 | Asars | 340—173.2 X |

IRVING L. SRAGOW, *Primary Examiner.*

BERNARD KONICK, *Examiner.*